US012623518B2

(12) United States Patent
Suzuki

(10) Patent No.: US 12,623,518 B2
(45) Date of Patent: May 12, 2026

(54) VEHICLE SUN VISOR WITH TICKET HOLDER

(71) Applicant: KYOWA SANGYO CORP., Toyota (JP)

(72) Inventor: Hiromoto Suzuki, Toyota (JP)

(73) Assignee: KYOWA SANGYO CORP., Toyota (JP)

( * ) Notice: Subject to any disclaimer, the term of this patent is extended or adjusted under 35 U.S.C. 154(b) by 336 days.

(21) Appl. No.: 18/265,842

(22) PCT Filed: Dec. 8, 2021

(86) PCT No.: PCT/JP2021/045179
§ 371 (c)(1),
(2) Date: Jun. 7, 2023

(87) PCT Pub. No.: WO2022/138172
PCT Pub. Date: Jun. 30, 2022

(65) Prior Publication Data
US 2024/0051376 A1      Feb. 15, 2024

(30) Foreign Application Priority Data

Dec. 24, 2020    (JP) ................................. 2020-214996

(51) Int. Cl.
B60J 3/02          (2006.01)
F16B 2/20          (2006.01)
(52) U.S. Cl.
CPC ............... B60J 3/0278 (2013.01); F16B 2/20 (2013.01)

(58) Field of Classification Search
None
See application file for complete search history.

(56) References Cited

U.S. PATENT DOCUMENTS

| | | | | |
|---|---|---|---|---|
| 5,577,791 | A | * 11/1996 | Viertel | ................... B60J 3/0282 |
| | | | | 362/144 |
| 11,807,191 | B2 | * 11/2023 | Nomura | ................. B60J 3/0282 |
| 2006/0138184 | A1 | * 6/2006 | Floch | .................... B60J 3/0204 |
| | | | | 224/482 |
| 2015/0352928 | A1 | 12/2015 | Mingay et al. | |
| 2021/0070231 | A1 | 3/2021 | Nomura | |

FOREIGN PATENT DOCUMENTS

| | | | |
|---|---|---|---|
| CN | 104129258 A | | 11/2014 |
| CN | 206297384 U | | 7/2017 |
| DE | 297010147 | * | 5/1997 |
| DE | 10340079 | * | 4/2005 |
| DE | 102009057085 | * | 6/2011 |

(Continued)

OTHER PUBLICATIONS

Dec. 25, 2025 Office Action issued in Chinese Patent Application No. 2021800869636.

*Primary Examiner* — Joseph D. Pape
(74) *Attorney, Agent, or Firm* — Oliff PLC

(57) ABSTRACT
A vehicle sun visor including a ticket holder that can hold a ticket or the like having a large thickness includes a visor body that has a plate shape. A ticket holder that holds a ticket in cooperation with the visor body is secured to the visor body. The visor body includes an escape portion that passes through or is provided so as to be recessed into a front surface of the visor body, at a position facing the ticket holder.

8 Claims, 8 Drawing Sheets

(56) References Cited

FOREIGN PATENT DOCUMENTS

| GB | 2317865 | A | * | 4/1998 | ............... B60R 7/05 |
| JP | 3115524 | B2 | | 12/2000 | |
| JP | 2003-175724 | A | | 6/2003 | |
| JP | 2004-042783 | A | | 2/2004 | |
| JP | 2004042783 | | * | 2/2004 | |
| KR | 19980029696 | | * | 8/1998 | |
| KR | 20020040180 | A | * | 5/2002 | ........... A45C 11/182 |
| WO | 2019/230797 | A1 | | 12/2019 | |

* cited by examiner

FORWARD

RIGHT ← → LEFT

REARWARD

VEHICLE SUN VISOR WITH TICKET HOLDER

TECHNICAL FIELD

The present invention relates to a vehicle sun visor with a ticket holder.

BACKGROUND ART

Patent Literature 1 discloses a sun visor that includes a ticket holder. The ticket holder includes a plate-shaped holder body made of resin. In the holder body, a boss projecting on a back surface is inserted into an opening hole formed on a sun visor body. The boss is stuck to the sun visor body by an adhesive agent. Thereby, the holder body is secured to the sun visor body. A protrusion for holding is formed on the back surface of the holder body. When a ticket is inserted between the holder body and the sun visor body, the holder body is elastically deformed. Using the elastic deformation of the holder body, the protrusion for holding presses the ticket against the sun visor body. Thereby, the ticket is held between the holder body and the sun visor body.

CITATION LIST

Patent Literature

Patent Literature 1: Japanese Patent No. 3115524

SUMMARY OF THE INVENTION

However, there is a limit on the elastic deformation amount of the holder body. Therefore, there is a limit on the thickness of the ticket that can be held between the holder body and the visor body. Hence, conventionally, a vehicle sun visor including a ticket holder that can hold a ticket having a large thickness is needed.

According to a characteristic of the present disclosure, a vehicle sun visor includes a visor body that has a plate shape. A ticket holder that holds a ticket in cooperation with the visor body is secured to the visor body. The visor body includes an escape portion that passes through or is provided so as to be recessed into a front surface of the visor body, at a position facing the ticket holder.

When the ticket is inserted between the ticket holder and the visor body, the ticket holder is elastically deformed. The ticket is pressed by the ticket holder, and is elastically deformed toward the escape portion. Therefore, the ticket is held between the ticket holder and the visor body, using both of the elastic deformation of the ticket holder and the elastic deformation of the ticket itself. The ticket is elastically deformed toward the escape portion, and therefore, even when the thickness of the ticket is large, the ticket is held between the ticket holder and the visor body, using the escape portion. In other words, the ticket having a large thickness can be held between the ticket holder and the visor body, while the escape portion avoids the ticket holder from being elastically deformed highly.

According to another characteristic of the present disclosure, the ticket holder includes a convex portion that bulges toward the side of the visor body. The escape portion is positioned so as to face the convex portion. Accordingly, the ticket is elastically deformed surely toward the escape portion of the visor body, using the convex portion of the ticket holder. Thus, the ticket can be elastically deformed surely. Moreover, by being pressed by the convex portion, the ticket is restrained from falling out of between the ticket holder and the visor body.

According to another characteristic of the present disclosure, the escape portion of the visor body has such a width length that the escape portion expands beyond both mutually facing edges of the convex portion. Accordingly, the convex portion is positioned within the width of the escape portion. Therefore, a first portion of the ticket that faces the convex portion is easily pressed by the convex portion, into the escape portion or toward the escape portion. On the other hand, second portions of the ticket on both sides of the first portion are easily returned to both sides of the convex portion through the escape portion. Therefore, the ticket can be elastically deformed surely.

According to another characteristic of the present disclosure, the convex portion of the ticket holder includes an inclined surface that gradually advances toward the side of the visor body from a distal end into which a ticket is inserted toward a base portion of the ticket holder. Accordingly, by inserting the ticket into the ticket holder, the ticket is elastically deformed smoothly to the side of the visor body along the convex portion of the ticket holder.

According to another characteristic of the present disclosure, the vehicle sun visor includes a coat that covers the visor body and the escape portion. Accordingly, the ticket holder presses the coat toward the escape portion of the visor body. The coat is elastically deformed so as to be recessed at the escape portion. When the ticket is put in between the coat and the ticket holder, the coat prevents the ticket from being caught by the escape portion. Thereby, the ticket is smoothly put in a gap between the ticket holder and the visor body. Moreover, since the escape portion of the visor body is covered by the coat, the vehicle sun visor having a good appearance is obtained.

According to another characteristic of the present disclosure, the vehicle sun visor includes: a support shaft that is attached to and detached from a vehicle body; and a fixation mount that secures the support shaft to the visor body. The ticket holder is provided on the fixation mount. Accordingly, the ticket holder is secured to the visor body, using the fixation mount that secures the support shaft to the visor body. Thereby, it is possible to reduce the number of components of the vehicle sun visor, or it is possible to simplify the production process for the vehicle sun visor.

According to another characteristic of the present disclosure, a second holder is disposed on a back surface of the front surface of the visor body on which the ticket holder is provided. The ticket holder and the second ticket holder are integrally secured to the visor body. Thereby, the ticket can be held on both surfaces of the visor body, and therefore the ticket holder can be used in the case of both a use position where the visor body is along a windshield and a stowed position where the visor body is along a ceiling surface. Moreover, the two ticket holders are integrated, and therefore are held by the visor body in cooperation.

According to another characteristic of the present disclosure, the vehicle sun visor includes a trim for a vanity mirror that is secured to the visor body. The ticket holder extends from an end edge of the trim. Accordingly, the ticket holder is secured to the visor body by securing the trim for the mirror to the visor body. Thereby, it is possible to reduce the number of components of the vehicle sun visor, or it is possible to simplify the production process for the vehicle sun visor.

MODES FOR CARRYING OUT THE INVENTION

Figure 1:
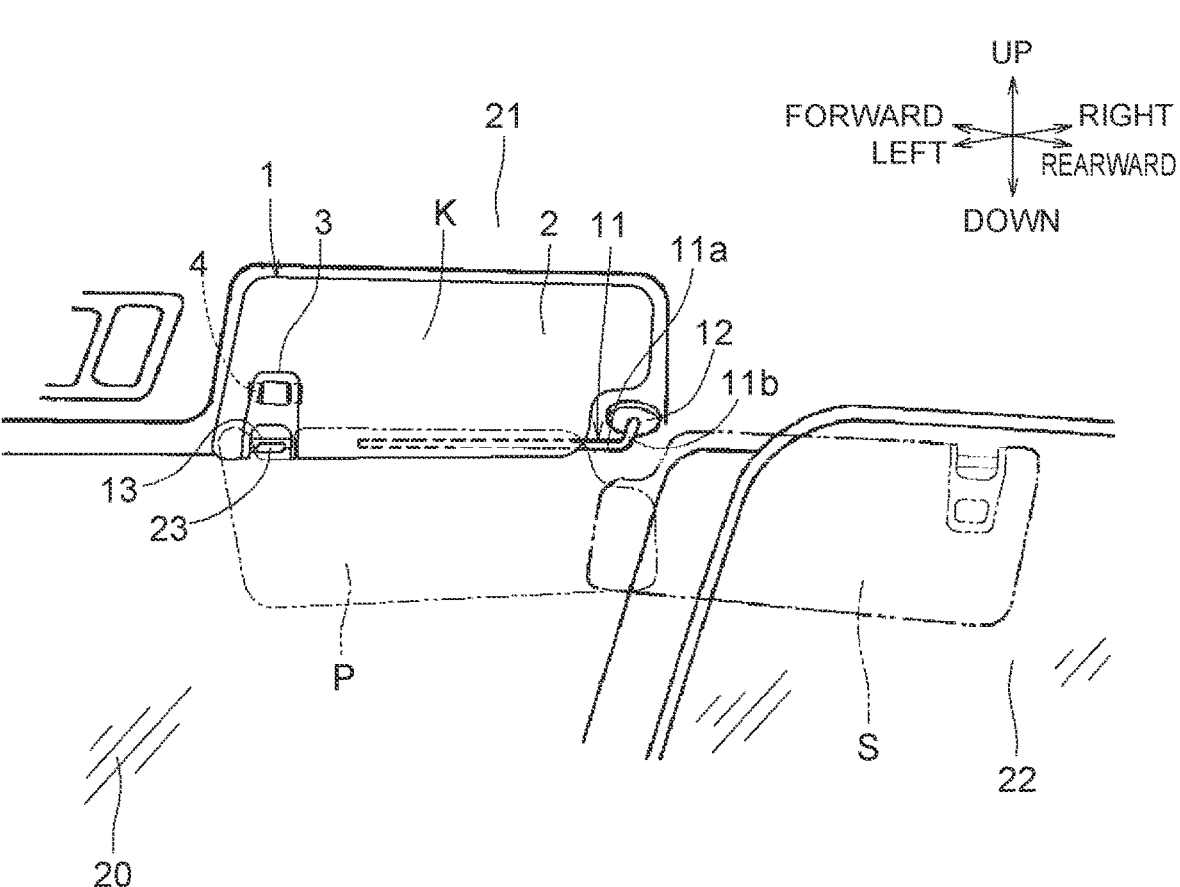
FIG. 1 is a perspective view of a part of a vehicle interior and a vehicle sun visor attached to a vehicle ceiling.

An embodiment of the present invention will be described with use of FIG. 1 to FIG. 5. As shown in FIG. 1, in a vehicle cabin, a vehicle sun visor 1 is secured to a ceiling surface 21 that is adjacent to an upper edge of a windshield 20. The vehicle sun visor 1 includes a visor body 2 that has a plate shape and a ticket holder 3 that is attached to the visor body 2.

As shown in FIG. 1, the visor body 2 is supported on the ceiling surface 21 by a supporting shaft 11, in a rotatable manner. The supporting shaft 11 is a bar having a roughly L-shape, and includes a horizontal shaft 11*a* and a vertical shaft 11*b*. The horizontal shaft 11*a* has a long shaft shape, and is inserted into an edge of the visor body 2, in a rotatable manner. The vertical shaft 11*b* extends upward from a distal end of the horizontal shaft 11*a*, so as to be roughly orthogonal to the horizontal shaft 11*a*. A distal end of the vertical shaft 11*b* is secured to a bracket 12 in a rotatable manner. The bracket 12 is attached to the ceiling surface 21 in the vehicle cabin.

As shown in FIG. 1, the visor body 2 is detachably secured to a hook 23 fixed to the ceiling surface 21 by a support rod 13. The support rod 13 has a roughly columnar shape. The support rod 13 is attached to the hook 23, and thereby, around an axis center of the support rod 13 and the horizontal shaft 11*a*, the visor body 2 is turned between a use position P where the visor body 2 is along the windshield 20 and a stowed position K where the visor body 2 is along the ceiling surface 21. By detaching the support rod 13 from the hook 23, the visor body 2 can be turned around the vertical shaft 11*b*. Thereby, the visor body 2 is turned between the use position P where the visor body 2 is along the windshield 20 and a side position S where the visor body 2 is along a side glass 22.

Figure 2:
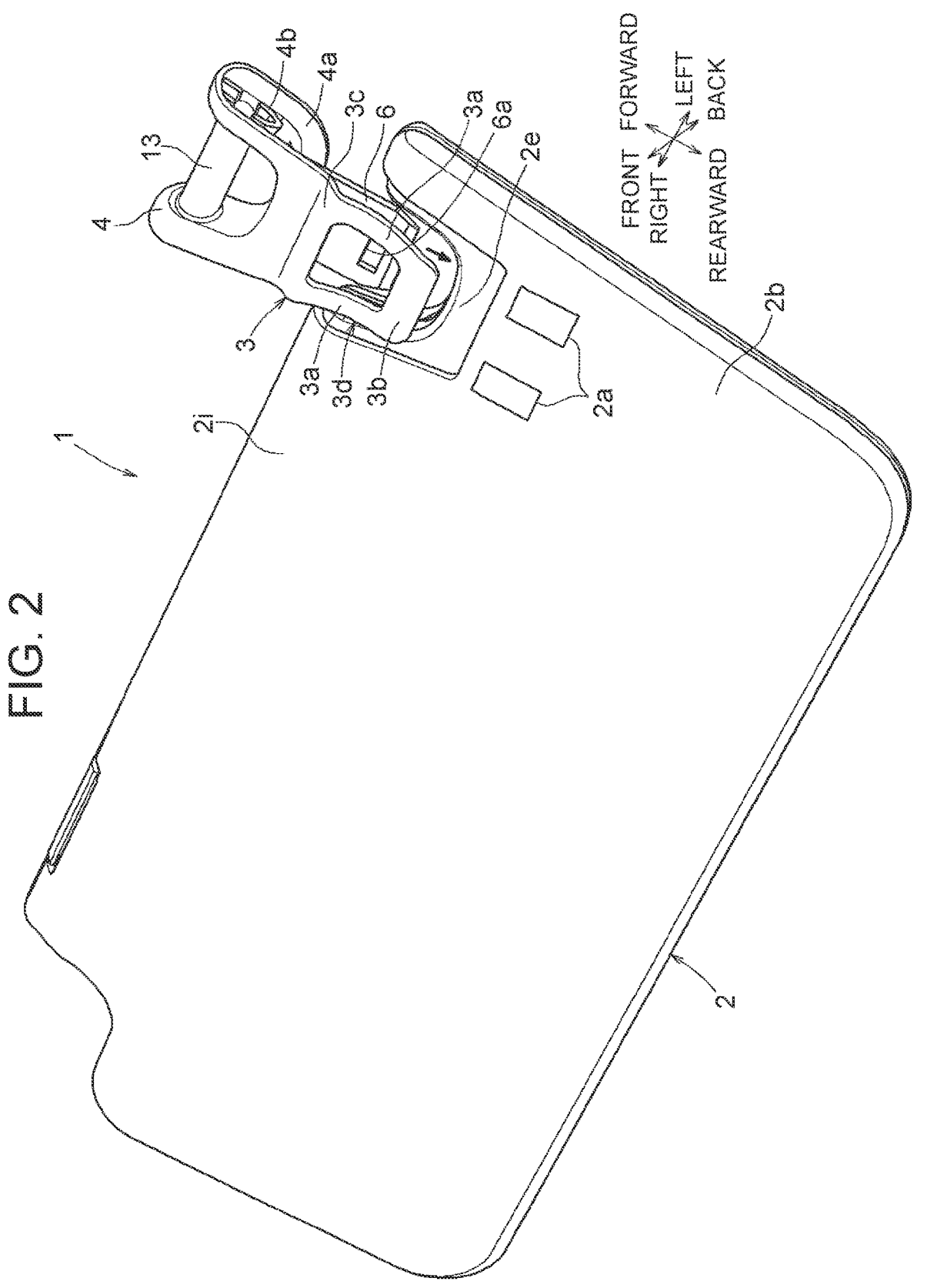
FIG. 2 is a perspective view of a sun visor body and a ticket holder according to a first embodiment.
Figure 4:
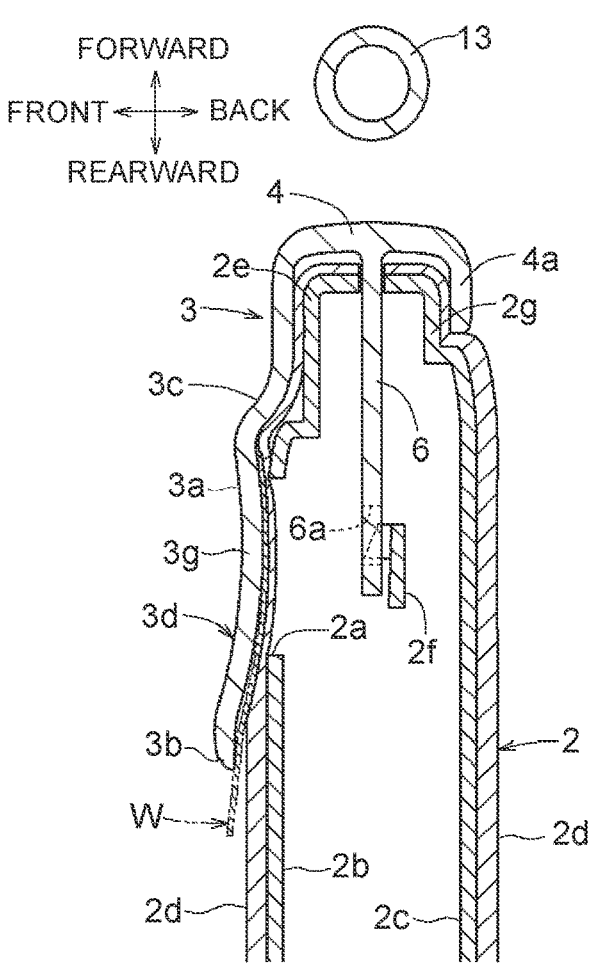
FIG. 4 is a IV-IV line sectional view of FIG. 3.

As shown in FIGS. 2 and 4, the visor body 2 includes a first shell 2*b* and a second shell 2*c* that have a tabular shape and that overlap in a thickness direction. Hereinafter, forward and rearward directions, right and left directions, and front and back direction are defined on the basis of a state where the visor body 2 is positioned at the stowed position K and is viewed from a user, and descriptions are made. The visor body 2 includes a forward edge 2*i* to which the support rod 13 is secured. The forward edge 2*i* includes a holder fixation portion 2*e* having a shape that is hollowed rearward. A fixation mount 4 including the support rod 13 is secured to the holder fixation portion 2*e*. A ticket holder 3 is provided on the fixation mount 4. The visor body 2 includes escape portions 2*a* at a position facing the ticket holder 3.

Figure 3:
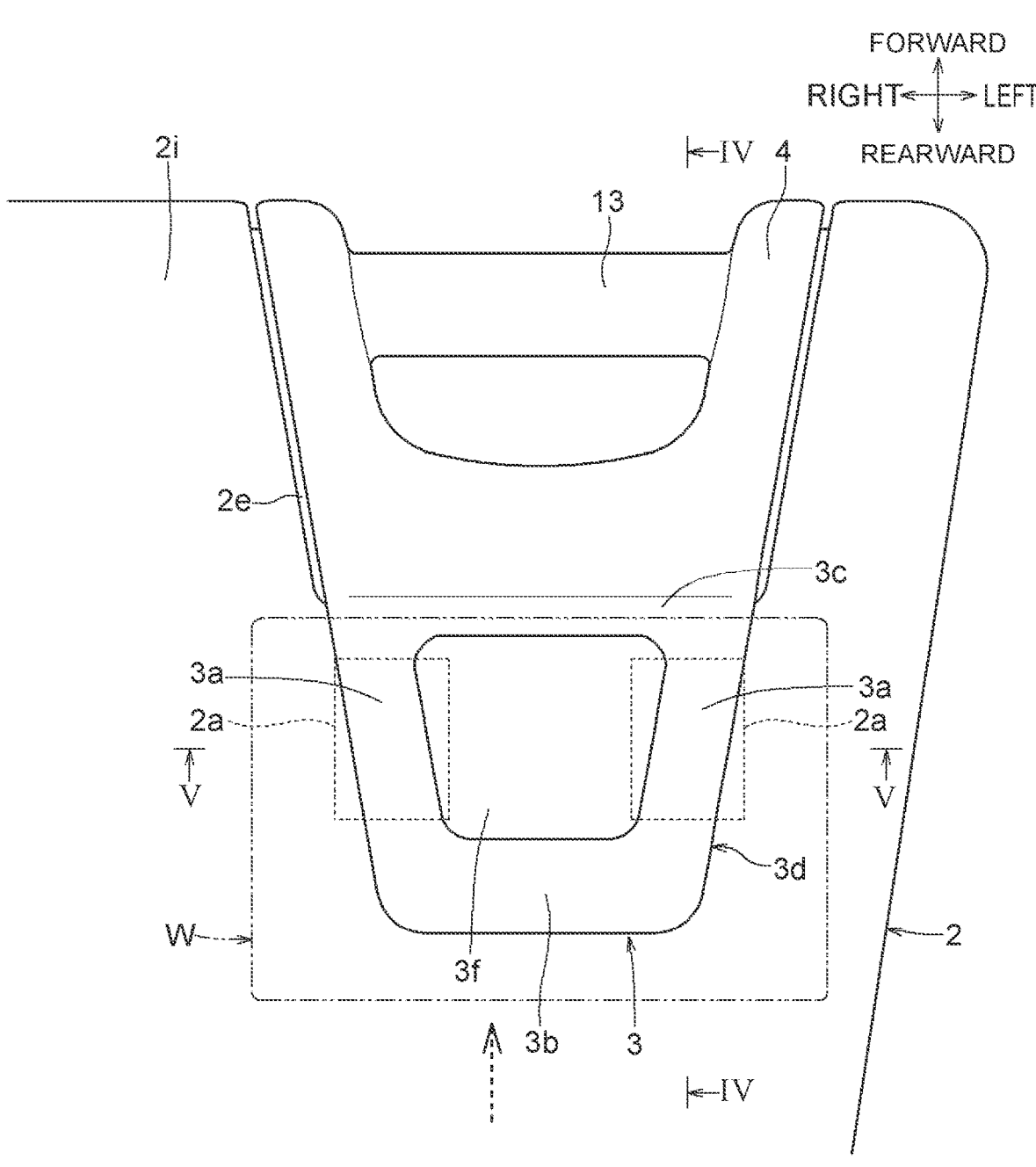
FIG. 3 is a plan view showing a state where the ticket holder is secured to the sun visor body according to the first embodiment.

As shown in FIGS. 2 and 3, the fixation mount 4 has a circular arc shape that is curved along the hollowed shape of the holder fixation portion 2*e*. The fixation mount 4 covers the holder fixation portion 2*e* from a front side and a rear side. The support rod 13 is provided in the fixation mount 4. Thereby, the support rod 13 is secured to the visor body 2 together with the ticket holder 3. The support rod 13 is positioned on an extended line of the horizontal shaft 11*a* that is inserted into the visor body 2. As shown in FIG. 4, the fixation mount 4 does not include the ticket holder 3, at a back piece 4*a* that contacts with the second shell 2*c* side of the single visor body 2. The visor body 2 includes a back piece engagement portion 2*g* on the second shell 2*c* side of the holder fixation portion 2*e*. The back piece engagement portion 2*g* is recessed along the shape of the back piece 4*a* of the fixation mount 4.

As shown in FIGS. 3 and 4, the ticket holder 3 holds a ticket W in cooperation with the visor body 2. Examples of the ticket W include a coupon, an admission ticket, and a thin plate-shaped member. The ticket W may be made of paper or made of resin, and the material does not matter. The ticket holder 3 includes a holder piece 3*d* that extends rearward from the fixation mount 4. For example, the ticket holder 3 is formed of a resin-made material or the like.

As shown in FIGS. 3 and 4, the holder piece 3*d* extends from a rearward end of the fixation mount 4 along the visor body 2. The holder piece 3*d* includes a base portion 3*c*, right and left pressing portions 3*a* that extend from the base portion 3*c*, and a distal end portion 3*b*. The base portion 3*c* extends in the right-left direction along the rearward end of the fixation mount 4. The right and left pressing portions 3*a* extend rearward from right and left ends of the base portion 3*c*. For the right and left pressing portions 3*a*, the distance between each other becomes closer toward distal ends. The distal end portion 3*b* couples the distal ends of the right and left pressing portions 3*a*. The holder piece 3*d* includes an opening portion 3*f* that is surrounded by the pressing portions 3*a*, the distal end portion 3*b* and the base portion 3*c*. The ticket W is inserted into a gap between the ticket holder 3 and the visor body 2 from the distal end portion 3*b* of the ticket holder 3 toward the base portion 3*c*.

As shown in FIGS. 3 and 4, the base portion 3*c* of the ticket holder 3 is curved to the front side while getting away from the fixation mount 4. At a longitudinal center, the pressing portion 3*a* includes a convex portion 3*g* that bulges toward the side of the visor body 2. The convex portion 3*g* includes an inclined surface that gradually advances toward the side of the visor body 2 from the distal end portion 3*b* toward the base portion 3*c*. Because of this configuration, when the ticket W is put from the distal end portion 3*b* into a gap between the holder piece 3*d* of the ticket holder 3 and the visor body 2, the holder piece 3*d* is pressed by the ticket W, and is elastically deformed in a direction of getting away from a front surface of the visor body 2. On the other hand, the ticket W is guided by the convex portion 3*g*, and thereby is smoothly inserted. Furthermore, the ticket W is pressed toward the front surface of the visor body 2 by the convex portion 3*g*.

As shown in FIG. 4, a securing portion 6 that is secured to the visor body 2 is provided on the fixation mount 4. The securing portion 6 has a plate shape, and extends rearward from a forward edge of the fixation mount 4. The securing portion 6 is positioned on the back side of the holder piece 3*d*, and extends from the fixation mount 4 roughly parallel to the holder piece 3*d*. The securing portion 6 includes, at a rearward end portion, a hole 6*a* having a quadrangular shape that is long in the right-left direction, (see FIG. 2). The hole 6*a* of the securing portion 6 is positioned at a place facing the opening portion 3*f* of the holder piece 3*d*. The securing portion 6 is put in between the first shell 2*b* and the second shell 2*c*, from the holder fixation portion 2*e* of the visor body 2. The hole 6*a* of the securing portion 6 is latched by a claw 2*f* that is provided on the second shell 2*c*. The fixation mount 4 includes retaining portions 4*b* at right and left edges that contact with both right and left ends of the support rod 13 (see FIG. 2). When the fixation mount 4 is secured to the visor body 2, the retaining portions 4*b* are fit with the holder fixation portion 2*e*. Thereby, the fixation mount 4 and the holder fixation portion 2*e* can restrain the wobble of the ticket holder 3 in the front-back direction, in cooperation.

Figure 5:
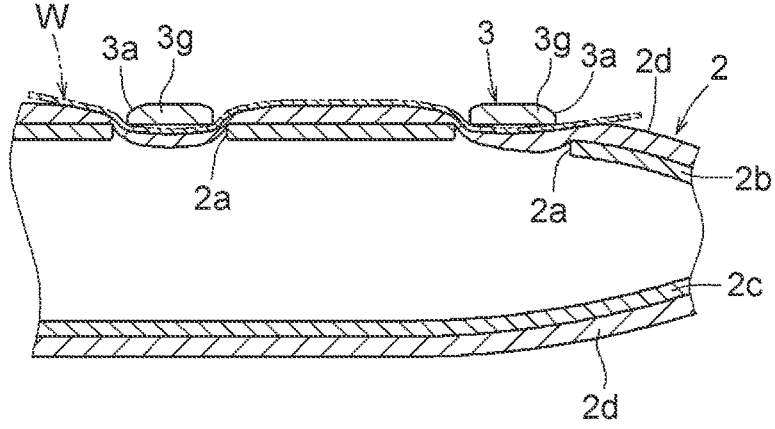
FIG. 5 is a V-V line sectional view of FIG. 3.

As shown in FIGS. 3 and 4, at least one escape portion 2*g*, for example, two right and left escape portions 2*a* are formed on the front surface of the visor body 2. The right and left escape portions 2*a* are respectively positioned at places where the front surface of the first shell 2*b* faces the right and left convex portions 3*g* of the ticket holder 3. The right and left escape portions 2*a* have a quadrangular shape, for example, and are long in the forward-rearward direction. The escape portion 2*a* passes from the front surface of the visor body 2 to a hollow portion. The width of the escape portion 2*a* is wider than the width of the convex portion 3*g*, and the convex portion 3*g* is positioned within the width of the escape portion 2*a*. Therefore, the escape portion 2*a* avoids the convex portion 3*g* from receiving force directly from the visor body 2. Thereby, the load that is given from the visor body 2 to the ticket holder 3, for example, the load that is applied to the base portion 3*c* is reduced As shown in FIGS. 4 and 5, the visor body 2 and the escape portion 2*a* are covered by a coat 2*d*. The coat 2*d* is formed of a material made of a soft resin such as a vinyl chloride resin, for example.

As described above, the vehicle sun visor 1 includes the plate-shaped visor body 2 as shown in FIG. 2. The ticket holder 3 that holds the ticket W in cooperation with the visor body 2 is secured to the visor body 2. The visor body 2 includes the escape portions 2*a* that pass through the front surface of the visor body 2, at the positions facing the ticket holder 3.

As shown in FIG. 4, when the ticket W is inserted between the ticket holder 3 and the visor body 2, the ticket holder 3 is elastically deformed. The ticket W is pressed by the ticket holder 3, and is elastically deformed toward the escape portions 2*a*. Therefore, the ticket W is held between the ticket holder 3 and the visor body 2, using both of the elastic deformation of the ticket holder 3 and the elastic deformation of the ticket W itself. The ticket W is elastically deformed toward the escape portion 2*a*, and therefore, even when the thickness of the ticket W is large, the ticket W is held between the ticket holder 3 and the visor body 2, using the escape portions 2*a*. In the other words, the ticket W having a large thickness can be held between the ticket holder 3 and the visor body 2, while the escape portions 2*a* avoid the ticket holder 3 from being elastically deformed highly.

As shown in FIG. 4, the ticket holder 3 includes the convex portions 3*g* that bulge toward the side of the visor body 2. The escape portions 2*a* are positioned so as to face the convex portions 3*g*. Accordingly, the ticket W is elastically deformed surely toward the escape portions 2*a* of the visor body 2, using the convex portions 3*g* of the ticket holder 3. Thus, the ticket W can be elastically deformed surely. Moreover, by being pressed by the convex portions 3*g*, the ticket W is restrained from falling out of between the ticket holder 3 and the visor body 2.

As shown in FIG. 5, the escape portion 2*a* of the visor body 2 has such a width length that the escape portion 2*a* expands beyond both mutually facing edges of the convex portion 3*g* of the ticket holder 3. Accordingly, the convex portion 3*g* is positioned within the width of the escape portion 2*a*. Therefore, a first portion of the ticket W that faces the convex portion 3*g* is easily pressed by the convex portion 3*g*, into the escape portion 2*a* or toward the escape portion 2*a*. On the other hand, second portions of the ticket W on both side of the first portion are easily returned to both sides of the convex portion 3*g* through the escape portion 2*a*. Therefore, the ticket W can be elastically deformed surely.

As shown in FIG. 4, the convex portion 3*g* of the ticket holder 3 includes the inclined surface that gradually advances toward the visor body 2, from the distal end into which the ticket W is inserted, toward the base portion 3*c* of the ticket holder 3. Accordingly, by inserting the ticket W into the ticket holder 3, the ticket W is elastically deformed smoothly to the side of the visor body 2 along the convex portion 3*g* of the ticket holder 3.

By providing the escape portions 2*a* on the visor body 2 as shown in FIG. 4, it is possible to avoid the ticket holder 3 from being elastically deformed highly. Thereby, the load that is applied to the base portion 3C is reduced. Accordingly, it is possible to restrain deformation, breakage and the like due to temperature change, time lapse or the like, and to maintain the holding performance of the ticket holder 3 for a long term.

As shown in FIGS. 4 and 5, the vehicle sun visor 1 includes the coat 2*d* that covers the visor body 2 and the escape portions 2*a*. Accordingly, the ticket holder 3 presses the coat 2*d* toward the escape portions 2*a* of the visor body 2. The coat 2*d* is elastically deformed so as to be recessed at the escape portions 2*a*. When the ticket W is put in between the coat 2*d* and the ticket holder 3, the coat 2*d* prevents the ticket W from being caught by the escape portions 2*a*. Thereby, the ticket W is smoothly put in a gap between the ticket holder 3 and the visor body 2. Moreover, since the escape portions 2*a* of the visor body 2 is covered by the coat 2*d*, the vehicle sun visor 1 having a good appearance is obtained.

As shown in FIG. 2, the vehicle sun visor 1 includes the support rod 13 (support shaft) that is attached to and detached from a vehicle body, and the fixation mount 4 that secures the support rod 13 to the visor body 2. The ticket holder 3 is provided on the fixation mount 4. Accordingly, the ticket holder 3 is secured to the visor body 2, using the fixation mount 4 that secures the support rod 13 to the visor body 2. Thereby, it is possible to reduce the number of components of the vehicle sun visor 1, or it is possible to simplify the production process for the vehicle sun visor 1.

The present disclosure is not limited to the external appearance and configuration of the embodiment disclosed in FIGS. 1 to 5, and various alterations, additions and deletions can be made within a range in which the gist is not changed. For example, the visor body 2 shown in FIGS. 2 and 5 includes the escape portions 2*a* that are through-holes. Instead of this visor body 2, the vehicle sun visor 1 may include a visor body 9 shown in FIG. 6. The visor body 9 shown in FIG. 6 has a solid plate shape in which a foam material 9*f* (for example, PP foam beads, urethane foam or the like) is used.

Figures 6, 7:
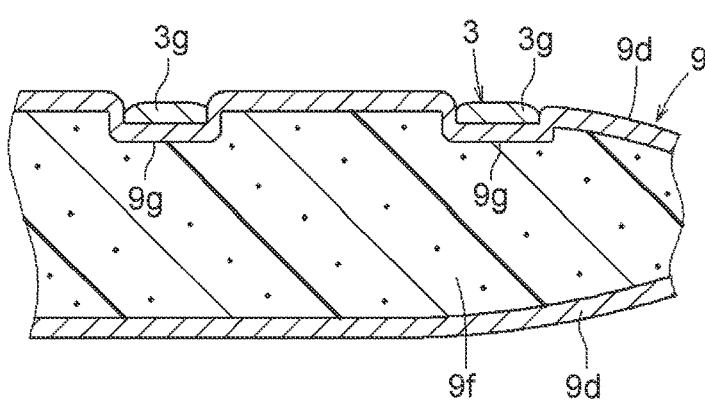
FIG. 6 is a diagram showing a sun visor body according to another embodiment and corresponding to FIG. 5.
FIG. 7 is a diagram showing a ticket holder according to another embodiment and corresponding to FIG. 3.

As shown in FIG. 6, the visor body 9 includes escape portions 9*g* having a concave shape, instead of the escape portions 2*a* shown in FIG. 5. At least one escape portion 9*g*, for example, two right and left escape portions 9*g* are formed on the front surface of the visor body 9. The escape portions 9*g* are recessed to the inside in the thickness direction from the front surface of the visor body 9. The right and left escape portions 9*g* are respectively positioned at places where the front surface of the visor body 9 faces the right and left convex portions 3*g* of the ticket holder 3. The right and left escape portions 9*g* have a quadrangular shape in planar view, for example, and are long in the forward-rearward direction. The visor body 9 and the escape portions 9*g* are covered by a coat 9*d*. The coat 9*d* is along the escape portions 9*g* by being pressed by the convex portions 3*g* of the ticket holder 3.

The visor body 2 may include escape portions 2*h* shown in FIG. 7, instead of the escape portions 2*a* shown in FIG. 2. The escape portions 2*h* have a narrower width than the width of the right and left pressing portions 3*a* of the ticket holder 3. The pressing portion 3*a* of the ticket holder 3 may include a convex portion 3*h* shown in FIG. 7, instead of the convex portion 3*g* shown in FIG. 2. The convex portion 3*h* projects from the pressing portion 3*a* toward the escape portion 2*h*. The convex portion 3*h* has a quadrangular shape in planar view, for example. The convex portion 3*h* is positioned within a region of the escape portion 2*h* in planar view, and is shorter in the forward-rearward direction and shorter in the right-left direction than the escape portion 2*h*. In other words, the escape portion 2*h* has such a width length that the escape portion 2*h* expands beyond the left edge and right edge of the convex portion 3*h* of the ticket holder 3.

As shown in FIG. 7, the escape portion 2*h* has such a length that the escape portion 2*h* expands beyond the forward edge and rearward edge of the convex portion 3*h*. Accordingly, the first portion of the ticket W that faces the convex portion 3*h* is easily pressed by the convex portion 3*h*, into the escape portion 2*h* or toward the escape portion 2*h*, not only in the right-left direction but also in the forward-rearward direction. On the other hand, the second portions of the ticket W on both sides of the first portion are easily returned to both sides of the convex portion 3*h* through the escape portion 2*h*. Therefore, it is easy to elastically deform the ticket W also in the forward-rearward direction.

Figure 8:
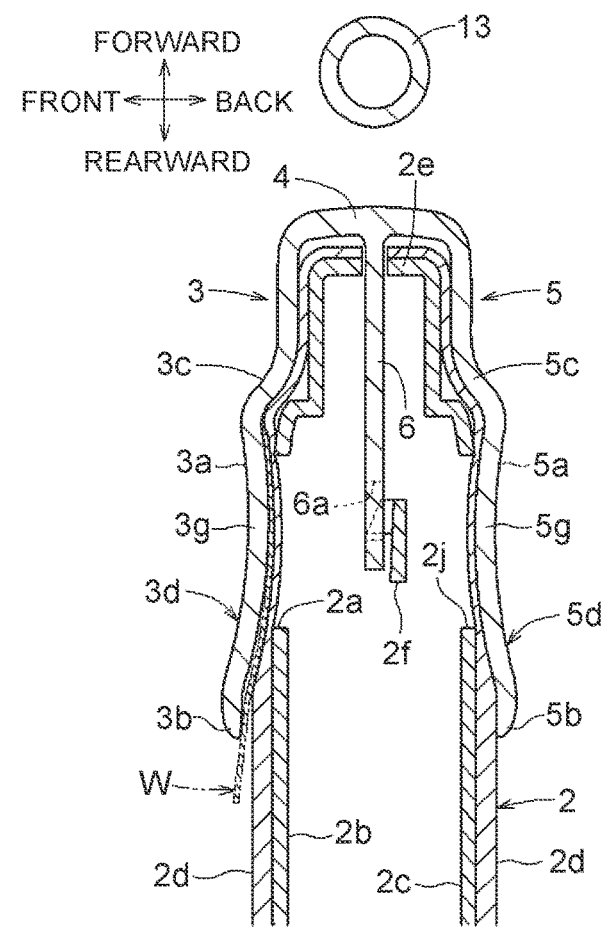
FIG. 8 is a diagram showing a ticket holder according to another embodiment and corresponding to FIG. 4.

As shown in FIG. 4, the ticket holder 3 is provided only on one side surface of the visor body 2. Instead of this, as shown in FIG. 8, ticket holders 3, 5 may be provided on both surfaces of the visor body 2. The second ticket holder 5 is provided at a back side edge of the fixation mount 4, instead of the back piece 4*a* of the fixation mount 4 shown in FIG. 4. The second ticket holder 5 is disposed on the back surface of the front surface of the visor body 2 on which the ticket holder 3 is provided. The ticket holder 3 and the second ticket holder 5 are integrally secured to the visor body 2. The second ticket holder 5 includes a holder piece 5*d* that includes pressing portions 5*a*, a distal end portion 5*b*, a base portion 5*c* and convex portions 5*g*, similarly to the holder piece 3*d* that includes the pressing portion 3*a*, distal end portion 3*b*, base portion 3*c* and convex portion 3*g* of the ticket holder 3.

Thereby, the ticket W can be held on both surfaces of the visor body 2, and therefore, the ticket holders 3, 5 can be used in the case of both the use position P where the visor body 2 is along the windshield 20 and the stowed position K where the visor body 2 is along the ceiling surface 21.

Moreover, the two ticket holders 3, 5 are integrated, and therefore are held by the visor body 2 in cooperation.

As shown in FIG. 8, on the visor body 2, an escape portion 2*j* is formed at a position facing the pressing portion 5*a* of the second ticket holder 5. The escape portion 2*j* is formed similarly to the escape portion 2*a* shown in FIG. 5.

Figure 9:
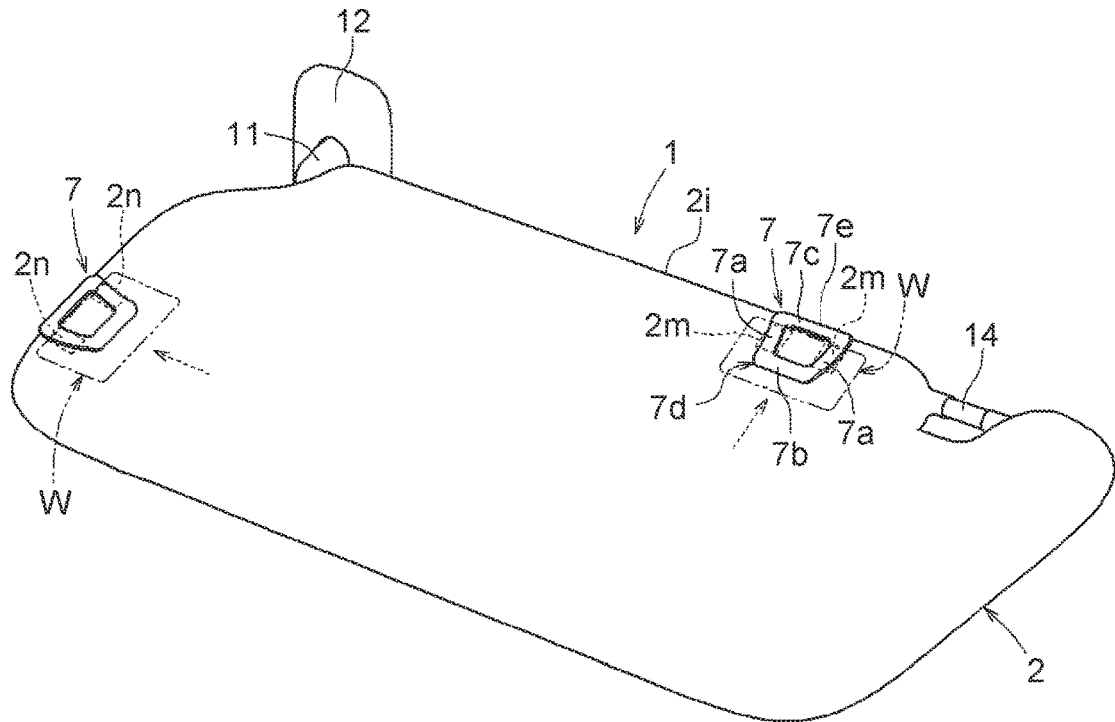
FIG. 9 is a perspective view of a sun visor body and a ticket holder according to another embodiment.

The vehicle sun visor 1 may include a support rod 14 and ticket holder 7 shown in FIG. 9, instead of the support rod 13 and ticket holder 3 shown in FIG. 2. The support rod 14 is attached to a portion that is hollowed rearward, at the forward edge 2*i* of the visor body 2. The support rod 14 is positioned coaxially with the horizontal shaft 11*a* of the supporting shaft 11.

As shown in FIG. 9, the ticket holder 7 is secured to an arbitrary position of one or both of a long edge and short edge of the visor body 2. The ticket holder 7 includes a holder piece 7*d* that holds the ticket W. For example, holder pieces 7*d* are disposed on both surfaces of the visor body 2. Each of the holder pieces 7*d* extends along the front surface or back surface of the visor body 2. Each of the front and back holder pieces 7*d* includes a base portion 7*c*, pressing portions 7*a* that extend from the base portion 7*c*, and a distal end portion 7*b*. The ticket holder 7 includes a coupling portion 7*e* that couples the front and back holder pieces 7*d*. The coupling portion 7*e* extends in the right-left direction along the front and back base portions 7*c* that are coupled. The ticket holder 7 is elastically deformed, and is secured to the visor body 2. The coupling portion 7*e* contacts with the long edge or short edge of the visor body 2.

The ticket holder 7 shown in FIG. 9 can be secured to an end edge of the visor body 2 from any side of the forward, rearward, right and left sides, without the fixation mount. Accordingly, the secured position of the ticket holder 7 can be selected depending on the specification of the visor body 2, and the like. The visor body 2 includes, on the front surface and the back surface, escape portions 2*n*, 2*m* at positions facing the pressing portion 7*a* of the ticket holder 7. For example, the escape portions 2*n*, 2*m* are formed similarly to the escape portion 2*a* shown in FIG. 5, the escape portion 9*g* shown in FIG. 6 or the escape portion 2*h* shown in FIG. 7. Convex portions that project toward the escape portions 2*n*, 2*m* may be provided on the pressing portions 7*a* of the ticket holder 7. A plurality of ticket holders 7 may be secured for one vehicle sun visor 1.

Figure 10:
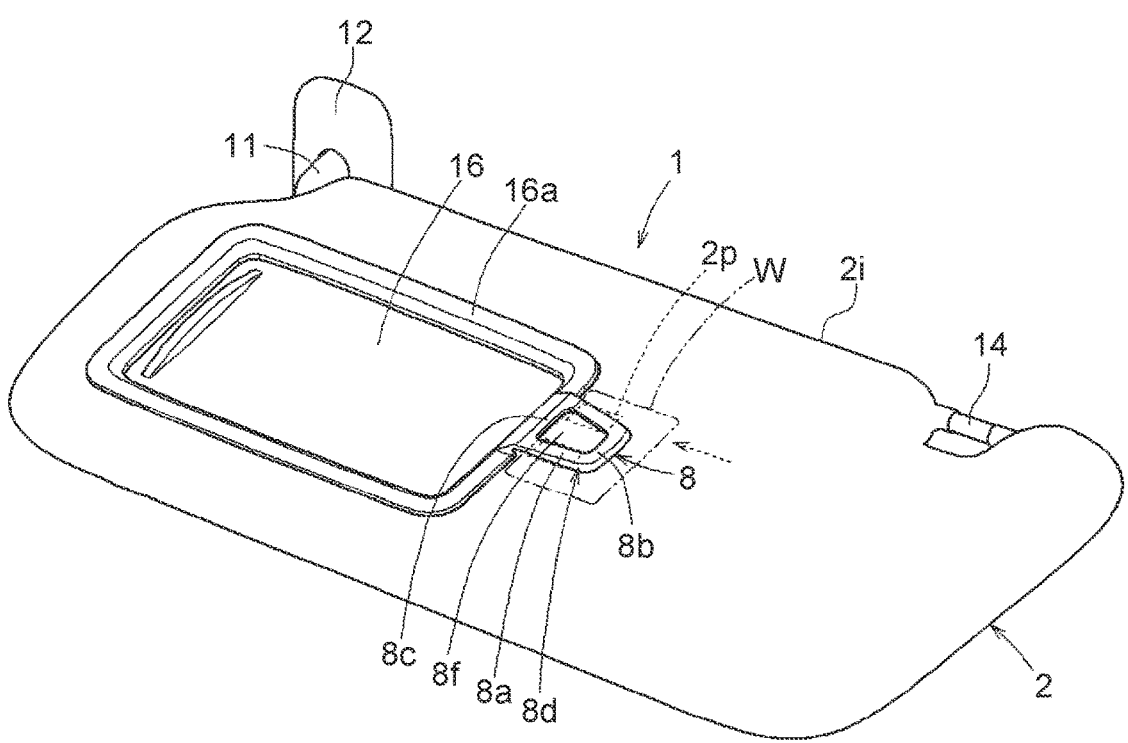
FIG. 10 is a perspective view of a sun visor body and a ticket holder according to another embodiment.

The vehicle sun visor 1 may include a ticket holder 8 shown in FIG. 10, instead of the ticket holder 3 shown in FIG. 2. The vehicle sun visor 1 shown in FIG. 10 includes a trim 16*a* for a vanity mirror 16 that is secured to the visor body 2. The ticket holder 8 extends from an end edge of the trim 16*a*. The vanity mirror 16 has a rectangular shape, and is secured to the surface of one side of the visor body 2. The trim 16*a* having a frame shape is provided at a circumferential edge of the vanity mirror 16.

As shown in FIG. 10, the ticket holder 8 includes a holder piece 8*d* that extends from the end edge of the trim 16*a* along the visor body 2. The holder piece 8*d* includes a base portion 8*c*, forward and rearward pressing portions 8*a* that extend from the base portion 8*c*, and a distal end portion 8*b*. The base portion 8*c* extends from one short edge of the trim 16*a* in a direction of getting away from the mirror 16. The forward and rearward pressing portions 8*a* extend from forward and rearward ends of the base portion 8*c* in the direction of getting away from the mirror 16. For the forward and rearward pressing portions 8*a*, the distance between each other becomes closer toward distal ends. The distal end portion 8*b* couples the distal ends of the forward and rearward pressing portions 8*a*. The holder pieces 8*d* includes an opening portion 8*f* that is surrounded by the pressing portions 8*a*, the distal end portion 8*b* and the base portion 8*c*.

As shown in FIG. 10, the visor body 2 includes, on the front surface, escape portions 2*p* at positions facing the pressing portions 8*a* of the ticket holder 8. For example, the escape portion 2*p* is formed similarly to the escape portion 2*a* shown in FIG. 5, the escape portion 9*g* shown in FIG. 6 or the escape portion 2*h* shown in FIG. 7. Convex portions that project toward the escape portions 2*p* may be provided on the pressing portions 8*a* of the ticket holder 8. The ticket holder 8 is secured to the visor body 2 by securing the trim 16*a* of the mirror 16 to the visor body 2. Thereby, it is possible to reduce the number of components of the vehicle sun visor 1, or it is possible to simplify the production process for the vehicle sun visor 1.

Figure 11:
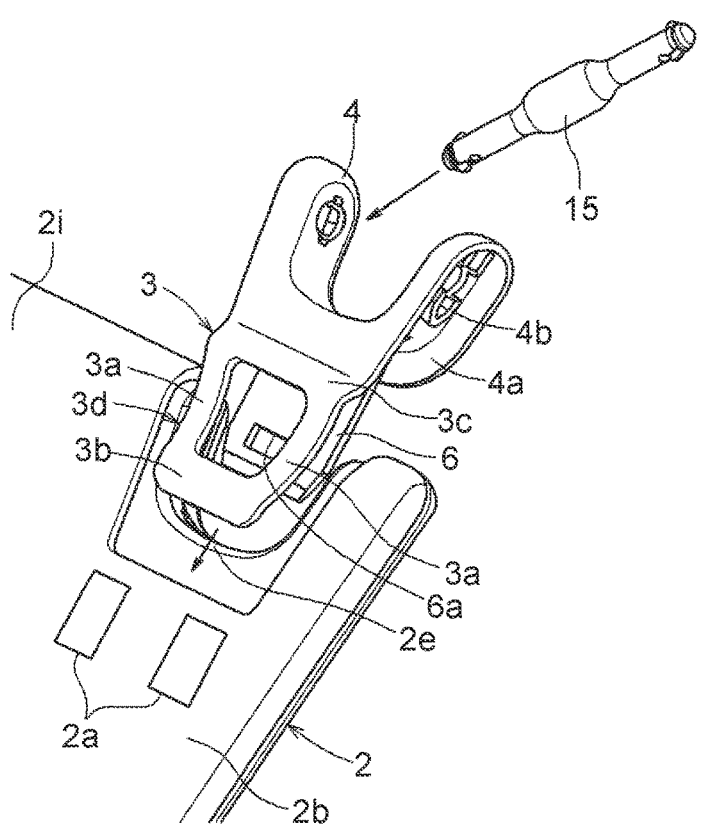
FIG. 11 is a perspective view of a ticket holder according to another embodiment.

The ticket holder 3 shown in FIG. 2 is integrated with the support rod 13 and the fixation mount 4, as one component. Instead of this support rod 13, as shown in FIG. 11, the support rod 15 may be isolated from the ticket holder 3 and the fixation mount 4, as a separate component. The support rod 15 may have a solid shape, instead of a roughly columnar hollow shape, and may have a shape in which the diameter around the axis partially differs. After the ticket holder 3 and the fixation mount 4 are secured to the visor body 2, the support rod 15 is secured at a coaxial position with the horizontal shaft 11*a* of the visor body 2. In addition, the ticket holder 3 and the fixation mount 4 may be isolated as separate components.

Figure 12:
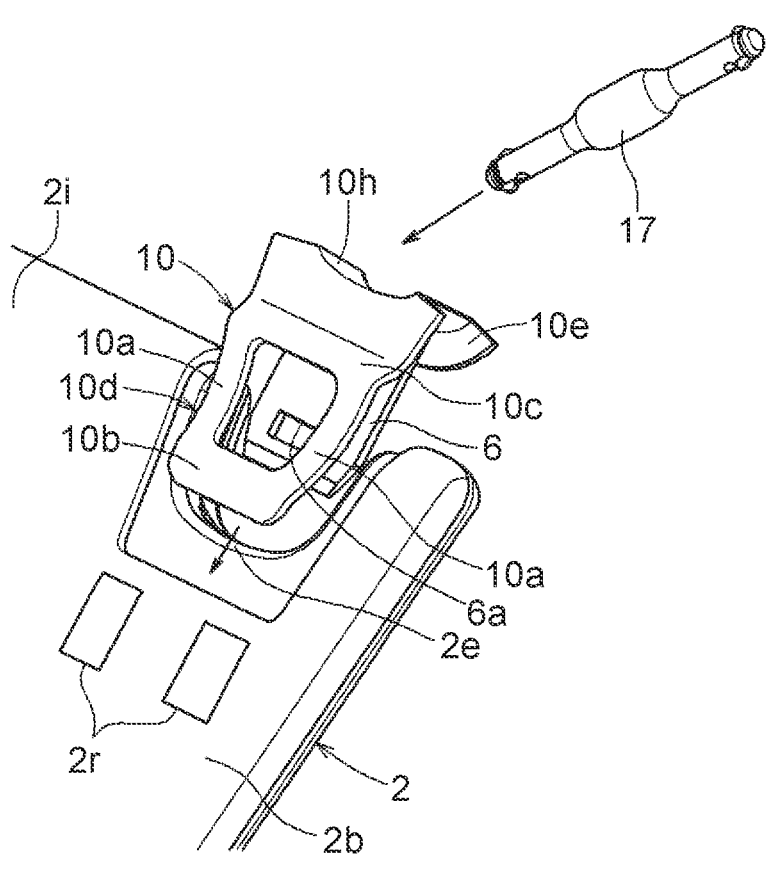
FIG. 12 is a perspective view of a ticket holder according to another embodiment.

The vehicle sun visor 1 may include a ticket holder 10 and support rod 17 shown in FIG. 12, instead of the ticket holder 3 shown in FIG. 2. The support rod 17 has a solid bar shape, and the diameter of an axially central portion is larger than both ends. The ticket holder 10 shown in FIG. 12 includes a holder piece 10*d* that holds the ticket W. For example, the holder piece 10*d* is disposed on the front surface of the visor body 2. The holder piece 10*d* extends along the front surface of the visor body 2. The holder piece 10*d* includes a base portion 10*c*, pressing portions 10*a* and a distal end portion 10*b*. The holder piece 10*d* is formed similarly to the holder piece 3*d* of the ticket holder 3 shown in FIG. 2. The ticket holder 10 includes a back piece 10*e* that is disposed on the back surface of the visor body 2 and a coupling portion 10*h* that couples the holder piece 10*d* and the back pieces 10*e*. The coupling portion 10*h* extends in the right-left direction along the base portion 10*c*.

As shown in FIG. 12, the coupling portion 10*h* of the ticket holder 10 includes a securing portion 6 that is secured to the visor body 2. The securing portion 6 has a plate shape, and extends rearward from the coupling portion 10*h*. The securing portion 6 is formed similarly to the securing portion 6 of the ticket holder 3 shown in FIG. 4. The ticket holder 10 is secured to the holder fixation portion 2*e* on the rearward side of the support rod 17. After the ticket holder 10 is secured to the visor body 2, the support rod 17 is secured coaxially with the horizontal shaft 11*a* of the visor body 2. The visor body 2 includes, on the front surface, escape portions 2*r* at positions facing the pressing portions 10*a* of the ticket holder 10. For example, the escape portion 2*r* is formed similarly to the escape portion 2*a* shown in FIG. 5, the escape portion 9*g* shown in FIG. 6 or the escape portion 2*h* shown in FIG. 7. Convex portions that project toward the escape portions 2*r* may be provided on the pressing portions 10*a* of the ticket holder 10.

The position and orientation of the ticket holder 3 that is secured to the visor body 2 are arbitrarily set depending on the specification of the vehicle, and the like. For example, in a state where the vehicle sun visor 1 shown in FIG. 1 is positioned at the stowed position K where the visor body 2 is along the ceiling surface 21, the ticket W is inserted into the ticket holder 3. Instead of this, the ticket holder 3 may be secured such that the ticket W is inserted in a state where the vehicle sun visor 1 is positioned at the use position P where the visor body 2 is along the windshield 20.

To the visor body 2 shown in FIGS. 2 and 11, the ticket holder 3 provided on the fixation mount 4 is secured together with the fixation mount 4. Instead of this, only the ticket holder 3 may be mounted to the visor body 2, without the fixation mount 4.

The visor body 2 and escape portions 2*a* shown in FIG. 3 are covered by the coat 2*d*. As the coat 2*d*, various kinds and thicknesses can be arbitrarily selected. Furthermore, the size and others of the escape portion 2*a* can be appropriately set depending on the kind and thickness of the coat 2*d*. Thereby, even the ticket W having a large thickness is elastically deformed toward the escape portions 2*a* by the convex portions 3*g*, and is stably held. Instead of covering the whole of the visor body 2 with the coat, surface treatment may be performed with a plate-shaped member made of resin or the like. Furthermore, the coat 2*d* may cover only the escape portions 2*a*.

The convex portion 3*g* of the ticket holder 3 shown in FIG. 4 has the inclined surface that gradually advances toward the side of the visor body 2 from the distal end portion 3*b* toward the base portion 3*c*. Instead of this, the escape portion of the visor body 2 and the convex portion 3*g* of the ticket holder 3 are set to various shapes and sizes, depending on the specification of the visor body 2, and the like. For example, a quadrangular convex portion having a smaller length and width than those of the pressing portion 3*a* may project from the holder piece toward the escape portion. Furthermore, the shape of the convex portion that projects may be another shape such as a circular arc shape.

The holder piece 3*d* of the ticket holder 3 shown in FIG. 3 includes the opening portion 3*f*. Instead of this, the ticket holder 3 may include a holder piece having no opening portion. For example, right and left convex portions may project from pressing portions having the same width as the holder piece.

For the ticket holder 3 shown in FIGS. 2 and 4, the hole 6*a* of the securing portion 6 is latched by the claw 2*f* that is provided on the second shell 2*c*. Instead of this securing portion 6, the ticket holder 3 may include a securing portion that is provided with a claw. For example, when the securing portion including the claw is put in the visor body 2, the claw of the securing portion is latched by a latch member in the visor body 2.

The visor body 2 shown in FIG. 5 has a hollow plate shape in which the first shell 2*b* and the second shell 2*c* overlap. Instead of this, the visor body 2 may have a hollow plate shape that is made by blow molding. Further, a solid plate shape may be formed of PP foam beads, urethane foam or the like.

REFERENCE SIGNS LIST 1 vehicle sun visor
2 visor body
2*a* escape portion
2*b* first shell
2*c* second shell
2*d* coat
2*e* holder fixation portion
3 ticket holder 3*a* pressing portion
3*b* distal end portion
3*c* base portion
3*d* holder piece
3*f* opening portion
3*g* convex portion
4 fixation mount
5 second ticket holder
6 securing portion
11 supporting shaft
12 bracket
13 support rod (support shaft)
W ticket

What is claimed is:

1. A vehicle sun visor with a ticket holder, comprising:
a visor body having a plate shape; and
the ticket holder secured to the visor body and configured to hold a ticket in cooperation with the visor body, wherein
the visor body includes an escape portion that passes through a front surface of the visor body or is provided so as to be recessed into the front surface of the visor body, at a position facing the ticket holder,
the ticket holder includes a convex portion that bulges toward a side of the visor body,
the escape portion faces the convex portion, and
the escape portion is narrower than a portion of the ticket holder other than the convex portion as viewed along a direction in which the convex portion bulges toward the side of the visor body.

2. The vehicle sun visor with the ticket holder according to claim 1, wherein the escape portion has such a width length that the escape portion expands beyond both mutually facing edges of the convex portion.

3. The vehicle sun visor with the ticket holder according to claim 1, wherein the convex portion of the ticket holder includes an inclined surface that gradually advances toward the side of the visor body from a distal end into which a ticket is inserted toward a base portion of the ticket holder.

4. The vehicle sun visor with the ticket holder according to claim 1, further comprising a coat covering the visor body and the escape portion.

5. The vehicle sun visor with the ticket holder according to claim 1, further comprising:
a support shaft configured to be attached to and detached from a vehicle body; and
a fixation mount configured to secure the support shaft to the visor body, wherein
the ticket holder is provided on the fixation mount.

6. The vehicle sun visor with the ticket holder according to claim 1, further comprising a second ticket holder disposed on a back surface of the front surface of the visor body, the ticket holder being provided on the front surface of the visor body, wherein
the ticket holder and the second ticket holder are configured to be integrally secured to the visor body.

7. The vehicle sun visor with the ticket holder according to claim 1, further comprising a trim for a vanity mirror that is secured to the visor body, wherein
the ticket holder extends from an end edge of the trim.

8. The vehicle sun visor with the ticket holder according to claim 1, wherein
the escape portion is wider than the convex portion as viewed along the direction in which the convex portion bulges toward the side of the visor body.

\* \* \* \* \*